(12) United States Patent
Liu et al.

(10) Patent No.: US 10,569,763 B2
(45) Date of Patent: Feb. 25, 2020

(54) HEV ENGINE START VIBRATION REDUCTION SYSTEM

(71) Applicant: FORD GLOBAL TECHNOLOGIES, LLC, Dearborn, MI (US)

(72) Inventors: Yu Liu, Novi, MI (US); Floyd Cadwell, Dearborn, MI (US); Kenneth Frederick, Dearborn, MI (US); Xiaoyong Wang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 173 days.

(21) Appl. No.: 15/660,078

(22) Filed: Jul. 26, 2017

(65) Prior Publication Data

US 2019/0031178 A1 Jan. 31, 2019

(51) Int. Cl.
*B60W 20/17* (2016.01)
*B60K 6/36* (2007.10)
(Continued)

(52) U.S. Cl.
CPC .............. *B60W 20/17* (2016.01); *B60K 6/36* (2013.01); *B60K 6/365* (2013.01); *B60K 6/48* (2013.01); *B60K 6/543* (2013.01); *B60W 10/06* (2013.01); *B60W 10/08* (2013.01); *B60W 10/105* (2013.01); *B60W 20/40* (2013.01);
(Continued)

(58) Field of Classification Search
CPC ...... B60W 20/17; B60W 10/06; B60W 10/08; B60W 10/105; B60W 30/20; B60W 2030/206; B60W 2510/0657; B60W 2510/081; B60W 2510/082; B60W 2520/105; B60W 2540/10; B60W 2540/106; B60W 2710/0666; B60W 2710/083; B60W 2710/1005; B60K 6/48; B60K 6/543; B60K 6/365; F02N 11/0814; F02N 2200/0802; F02N 2300/104; B60Y 2200/92; B60Y 2306/09; Y10S 903/91;
(Continued)

(56) References Cited

U.S. PATENT DOCUMENTS 7,164,247 B2    1/2007    Joe et al.
7,273,119 B2    9/2007    Tsuneyoshi et al.
(Continued)

*Primary Examiner* — Muhammad Shafi
(74) *Attorney, Agent, or Firm* — Brooks Kushman PC; David Kelley

(57) ABSTRACT

A hybrid electric power-split vehicle, equipped with a continuously variable transmission coupling an electric motor/generator (EM) with a combustion engine (CE), includes systems and methods that reduce possible resonant noise and vibration during CE startup, by improved EM control, to generate compensating EM torque to counter act such possible resonant noise and vibration. The systems and methods include predetermined baseline CE operating condition (OC) cranking torque profiles stored as OC grids (SOCGs). A start profile is generated from selected cranking torque SOCGs, and also from selected historical start OCGs (HOCGs) of prior engine and/or CE starts, which include prior start noise and vibration metrics along with prior start OCs and related parameters. The start profile is calibrated using a blend factor that is generated from comparisons of SOCGs, and utilized to generate a feed-forward torque signal that adjusts EM torque to reduce the startup noise and vibration resonances.

9 Claims, 3 Drawing Sheets

(51) Int. Cl.
*B60W 20/40* (2016.01)
*B60K 6/365* (2007.10)
*B60K 6/48* (2007.10)
*B60K 6/543* (2007.10)
*B60W 10/06* (2006.01)
*B60W 10/08* (2006.01)
*B60W 10/105* (2012.01)
*B60W 30/20* (2006.01)
*F02N 11/08* (2006.01)
*B60W 50/00* (2006.01)

(52) U.S. Cl.
CPC ......... *B60W 30/20* (2013.01); *F02N 11/0814* (2013.01); *B60K 2006/4825* (2013.01); *B60W 2030/206* (2013.01); *B60W 2050/0012* (2013.01); *B60W 2050/0088* (2013.01); *B60W 2050/0089* (2013.01); *B60W 2510/0657* (2013.01); *B60W 2510/081* (2013.01); *B60W 2510/082* (2013.01); *B60W 2520/105* (2013.01); *B60W 2540/10* (2013.01); *B60W 2540/106* (2013.01); *B60W 2710/0666* (2013.01); *B60W 2710/083* (2013.01); *B60W 2710/1005* (2013.01); *B60Y 2200/92* (2013.01); *B60Y 2306/09* (2013.01); *F02N 2200/0802* (2013.01); *F02N 2300/104* (2013.01); *Y10S 903/91* (2013.01); *Y10S 903/918* (2013.01); *Y10S 903/93* (2013.01); *Y10S 903/945* (2013.01)

(58) Field of Classification Search
CPC . Y10S 903/918; Y10S 903/945; Y10S 903/93
USPC .......................................................... 701/22
See application file for complete search history.

(56) References Cited

U.S. PATENT DOCUMENTS

| | | |
|---|---|---|
| 8,666,580 B2 | 3/2014 | Hashimoto |
| 8,720,401 B2 | 5/2014 | Vogt et al. |
| 2006/0132071 A1* | 6/2006 | Oh ........................ H02P 6/21 318/400.12 |
| 2011/0220629 A1* | 9/2011 | Mehn .................... B23K 9/125 219/136 |
| 2015/0066259 A1* | 3/2015 | Thompson ............ B60W 10/06 701/22 |

* cited by examiner

HEV ENGINE START VIBRATION REDUCTION SYSTEM

TECHNICAL FIELD

The present disclosure relates generally to systems and methods for reduction of engine vibration during start of a hybrid electric vehicle.

BACKGROUND

Hybrid electric vehicles (HEVs) have a powertrain that includes a propulsion engine, such as a combustion engine (CE) and an electric machine/generator or electric motor generator/starter (EM), which generate power and torque to propel the vehicle. Unlike a conventional driveline with an automatic transmission where a fluid coupling torque converter is present, HEVs may have a power split powertrain transfer the torques from the CE and EM to the vehicle driveline and wheels with less mechanical damping. Controlling such HEVs to ensure favorable occupant drivability perceptions, requires reduction of undamped or insufficiently damped noise and vibration, especially when transiting between from electric and CE modes that require a stopped CE to restart.

Power split HEV powertrains include a planetary gear set having speed ratios that enable control of engine and/or CE speed, by controlled EM speed torque signals. During a startup cranking phase of CE in such a power split HEV, the EM speed is accelerated to bring the CE speed up to a desired CE speed before the combustion is initiated. During engine and/or CE spool up, the CE and powertrain progresses through one or more possible resonance speed ranges, according to mechanical damping characteristics of the CE, EM, and powertrain, which may include an electronic continuously variable transmission (eCVT). In some circumstances, such possible resonance may be perceptible to vehicle occupants during low HEV speeds when road and other nominal vibrations and noise may otherwise mask CE startup resonances. Previously, such possible resonance(s) were addressed by either reducing the CE spool up time, or by a computationally intensive real-time, thermodynamically-based CE torque control capability.

SUMMARY

The disclosure is directed to systems and methods for reducing, compensating, and/or canceling resonant noise and vibration during engine and/or CE startup in eCVT-equipped, power-split HEVs. The systems and methods enable improved control of EM to generate, at discrete time intervals during CE startup, compensating torque to counter act such possible CE and powertrain noise and vibration resonances. The system and method includes predetermined and/or experimentally determined, baseline CE operating condition (OC) cranking torque profiles, which are stored as OC grids (SOCGs) in a cranking torque profile or SOCGs database. The SOCGs and databases are stored in one or more HEV controllers and/or components, and are selected during HEV operation as a function of HEV current operating and environmental conditions.

A start profile is generated or produced from the selected cranking torque OCG or SOCG, and also from historical start OCGs (HOCGs) of prior engine and/or CE starts that are also recorded as SOCGs in an historical database, which include prior start noise and vibration metrics along with prior start OCs and related parameters. The start profile is calibrated using a blend factor that is in turn generated from a comparison, difference, and/or "distance" between the current OC, the selected cranking torque OCG, and the historical start OCG. The calibrated start profile is utilized to generate a feed-forward torque signal that adjusts and controls EM torque to reduce, compensate, and/or cancel the startup noise and vibration resonances.

More specifically, the controller(s) are configured to select a nearest operating condition (OC) grid (NOCG) from the stored operating condition grids (SOCGs) according to the current CE OC. The controller(s) utilize the current OC of the CE to search the cranking torque SOCGs to determine and then select the SOCG that is nearest to the current CE OC. Additionally, the controller(s) also select from the SOCGs one of: (a) an HOCG, and when there are not any stored HOCGs, (b) a nearest neighbor OC grid (NNOCG). The NNOCG is found similar to the earlier search for the closest or nearest cranking torque SOCG, and is the next closest or nearest cranking torque SOCG, which may be utilized when there are not any previously recorded HOCGs available.

Once the NOCG, HOCG, and/or NNOCG are found and selected, the controller(s) generate the blend factor, which is a smallest difference or "distance" between the current CE OC, and each of the NOCG and the one of the HOCG and the NNOCG. The start profile is then generated, produced, and/or calibrated with the blend factor, and the NOCG and the one of the HOCG and NNOCG. The controller(s) then generate an engine and/or a CE cranking torque and the feedforward torque signal for the EM, from the calibrated start profile, such that possible noise and vibration resonances can be reduced, compensated, and/or canceled.

The controller(s) also may utilize the calibrated start profile and the CE generated CE cranking torque to adjust a gear ratio of the eCVT to further reduce, compensate, and/or cancel the possible startup resonances of noise and vibration. Additionally, the controller(s) may incorporate and/or utilize a cranking torque compensation factor, according to a mechanical damper model of the eCVT, to further calibrate the CE cranking torque. The additionally calibrated CE cranking torque may be utilized to further adjust the eCVT gear ratio.

An engine start OC and noise and vibration recorder may be included with and/or coupled to the controller(s) and other HEV components and systems, and is configured to generate and store in the historical database, new HOCGs for each engine start and to also include a minimum noise and vibration metric (MNVM). The controller(s) may generate the MNVM directly, and may also detect engine and/or CE startup noise and vibration from one or more sources including at least an active noise cancellation microphone, electric machine speeds and accelerations, vehicle body accelerations, CE mount vibrations, vehicle sensitivity parameters, and accelerator pedal positions and change rates. The controller(s) may further generate a predetermined correlation value for each detected noise and vibration source, which correlates actual noise and vibration perceived by a vehicle occupant, and generate the MNVM from the correlation values. The controller(s) may additionally utilize the MNVM to generate the distance by comparing the current CE OC and current CE start up noise and vibration to the OC and MNVM of each NOCG, HOCG, and NNOCG.

This summary of the implementations and configurations of these vehicles and methods of operation describe in less technically detailed variations, several exemplary arrangements for the embodiments of this disclosure, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example configurations, as is further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like and similar reference numbers refer to similar, related, and/or identical elements throughout the figures. The figures and annotations thereon are provided to facilitate understanding of the disclosure without limiting the breadth, scope, scale, or applicability of the disclosure. The drawings are not necessarily made to scale and may be schematic diagrams intended to describe the disclosure to those knowledgeable in the relevant fields of technology.

DETAILED DESCRIPTION

Embodiments of the present disclosure are described herein. It is to be understood, however, that the disclosed embodiments are merely examples, and that other embodiments and alternative arrangements thereof can take other various and preferably optional forms. The figures include some features that may be exaggerated or minimized to show or emphasize details of certain components. Therefore, specific structural and functional details disclosed herein are not to be interpreted as limiting, but merely as a representative and illustrative basis for demonstrating to and teaching those skilled in the art to variously employ the embodiments of this disclosure.

As those of ordinary skill in the art should understand, various features, components, and processes illustrated and described with reference to any one of the figures may be combined with features, components, and processes illustrated in one or more other figures to produce embodiments that should be apparent to and within the knowledge of those skilled in the art, but which may not be explicitly illustrated or described. The combinations of features illustrated here are representative embodiments for many typical applications. Various combinations and modifications of the features consistent with the teachings of this disclosure, however, could be desired for particular applications or implementations, and should be readily within the knowledge, skill, and ability of those working in the relevant fields of technology.

Figure 1:
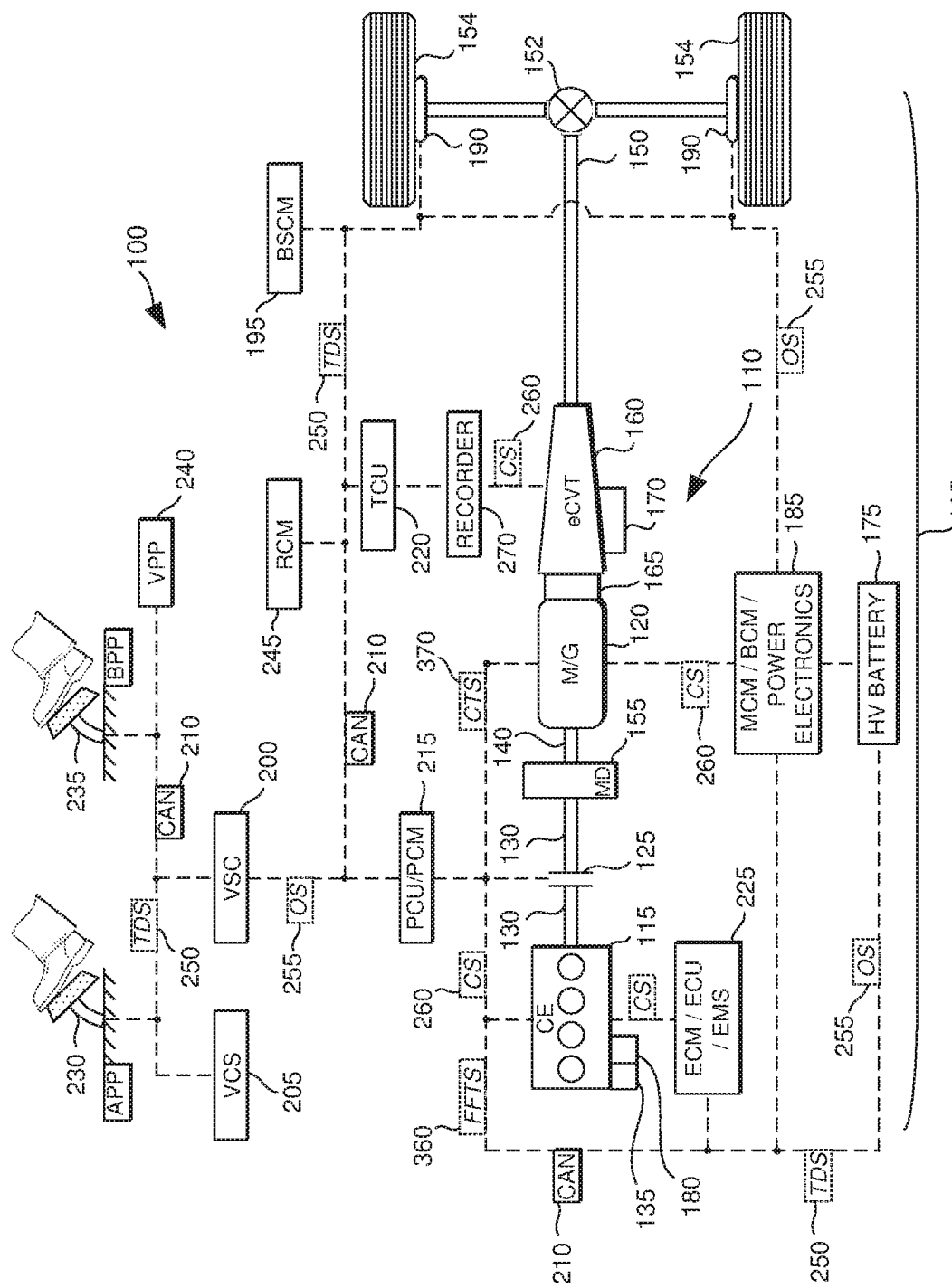
FIG. 1 is an illustration of a hybrid electric vehicle and its systems, components, sensors, actuators, and methods of operation.
Figure 2:
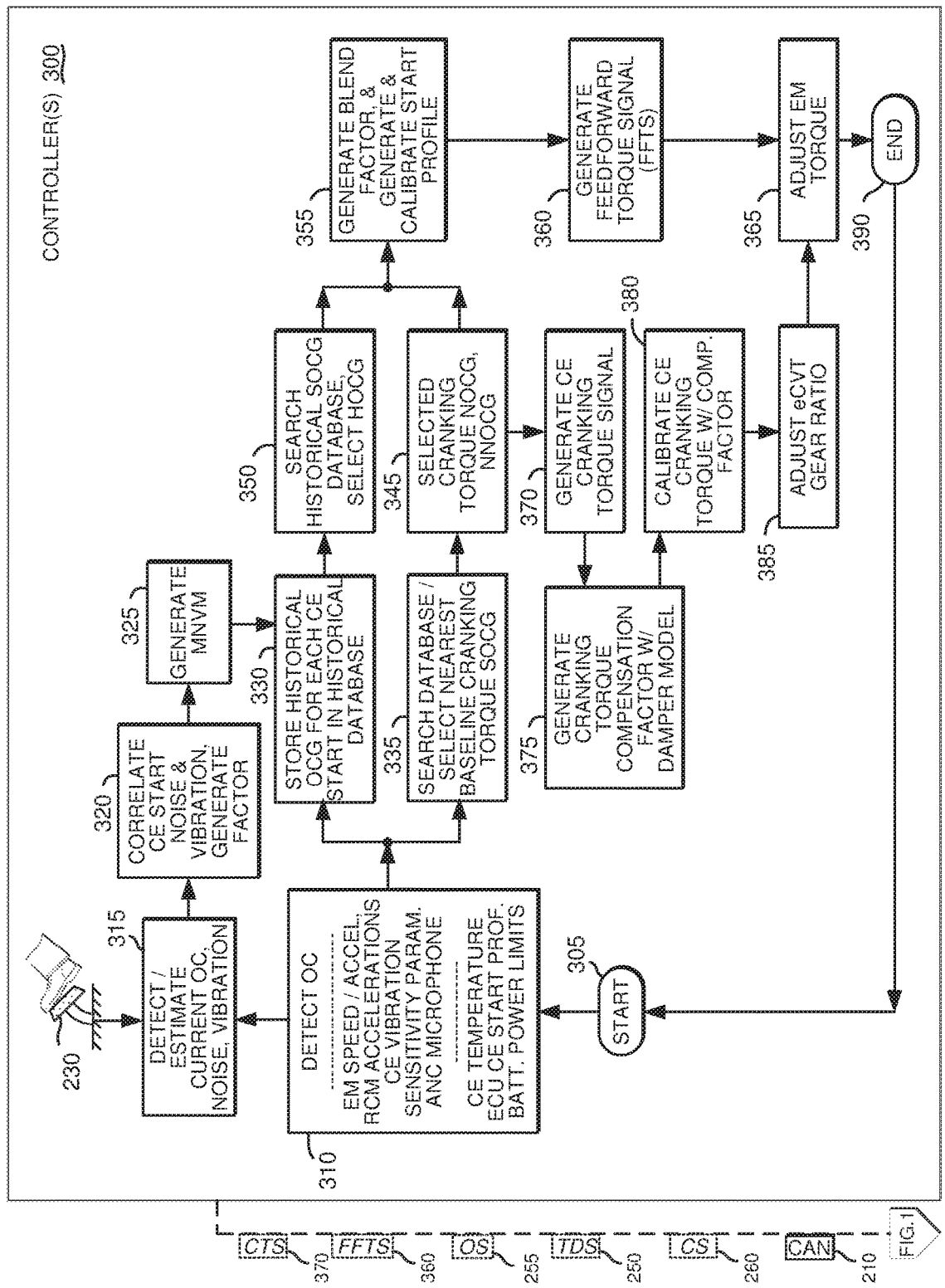
FIG. 2 illustrates additional aspects and capabilities of the vehicle and systems and methods of FIG. 1, with certain components and features added, removed, modified, and rearranged.
Figure 3:
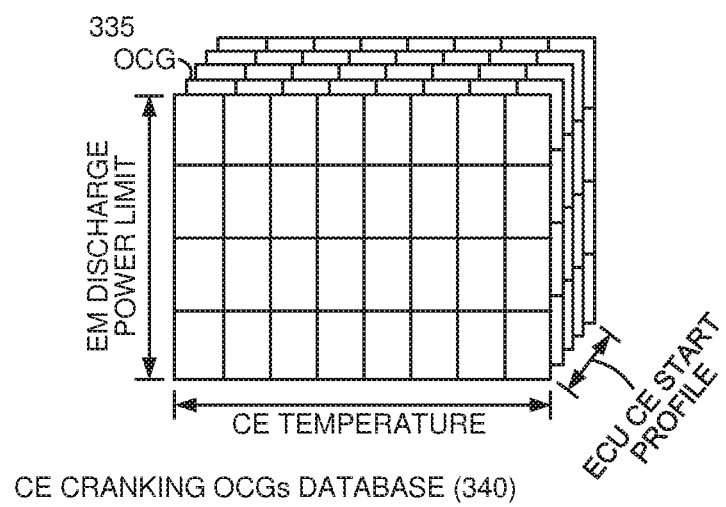
FIG. 3 depicts various aspects of components of FIGS. 1 and 2.

With reference now to the various figures and illustrations and to FIGS. 1, 2, and 3, and specifically now to FIG. 1, a schematic diagram of a hybrid electric vehicle (HEV) 100 is shown, and illustrates representative relationships among components of HEV 100. Physical placement and orientation of the components within vehicle 100 may vary. Vehicle 100 includes a driveline 105 that has a powertrain 110, which includes a combustion engine (CE) 115 and an electric machine or electric motor/generator/starter (EM) 120, which generate power and torque to propel vehicle 100. Engine 115 is a gasoline, diesel, biofuel, natural gas, or alternative fuel powered engine, or a fuel cell, which generates an output torque in addition to other forms of electrical, vacuum, pressure, and hydraulic power by way of front end engine accessories described elsewhere herein. Engine 115 may be coupled to electric machine or EM 120 with a disconnect clutch 125. Engine 115 generates such power and associated engine output torque for transmission to EM 120 when disconnect clutch 125 is at least partially engaged.

EM 120 may be any one of a plurality of types of electric machines, and for example may be a permanent magnet synchronous motor, electrical power generator, and engine starter 120. For example, when disconnect clutch 125 is at least partially engaged, power and torque may be transmitted from engine 115 to EM 120 to enable operation as an electric generator, and to other components of vehicle 100. Similarly, EM 120 may operate as a starter for engine 115 with disconnect clutch 125 partially or fully engaged to transmit power and torque via disconnect clutch drive shafts 130 to engine 115 to start engine 115, in vehicles that include or do not include an independent engine starter 135.

Further, EM 120 may assist engine 115 in a "hybrid electric mode" or an "electric assist mode" by transmitting additional power and torque to turn drive shafts 130 and 140. Also, EM 120 may operate in an electric only mode wherein engine 115 is decoupled by disconnect clutch 125 and shut down, enabling EM 120 to transmit positive or negative torque to EM drive shaft 140. When in generator mode, EM 120 may also be commanded to produce negative torque and to thereby generate electricity for charging batteries and powering vehicle electrical systems, while engine 115 is generating propulsion power for vehicle 100. EM 120 also may enable regenerative braking by converting rotational energy from decelerating powertrain 110 and/or wheels 154 into electrical energy for storage, as described in more detail below, in one or more batteries 175, 180.

Disconnect clutch 125 may be disengaged to enable engine 115 to stop or to run independently for powering engine accessories, while EM 120 generates drive power and torque to propel vehicle 100 via EM drive shaft 140, and transmission output drive shaft 150. In other arrangements, both engine 115 and EM 120 may operate with disconnect clutch 125 fully or partially engaged to cooperatively propel vehicle 100 through drive shafts 130, 140, 150, differential 152, and wheels 154. Differential 152 may transmit approximately equal torque to each wheel 154 and accommodates slight speed differences to enable the vehicle to turn and maneuver. Different types of differentials or similar devices may be used to distribute equal and/or unequal torque from powertrain 110 to wheels 154, for rear-dive, front-drive, and all-wheel drive vehicles. In some vehicles, differential torque distribution may be controlled and varied to enable desired operating modes or conditions wherein each vehicle wheel 154 receives different torque.

Drive shaft 130 of engine 115 and EM 120 may be a continuous, single, through shaft that is part of and integral with EM drive shaft 140, or may be a separate, independent drive shaft 130 that may be configured to turn independently of EM drive shaft 140, for powertrains 110 that include multiple, inline, or otherwise coupled EM 120 configurations. The schematic of FIG. 1 also contemplates alternative configurations with more than one engine 115 and/or EM 120, which may be offset from drive shafts 130, 140, and where one or more of engines 115 and EMs 120 are positioned in series and/or in parallel elsewhere in driveline 105, such as between or as part of a transmission, off-axis from the drive shafts, and/or elsewhere and in other arrangements. Still other variations are contemplated without deviating from the scope of the present disclosure.

Driveline 105 and powertrain 110 also include a mechanical damper (MD) 155, and a transmission 160, which may be an electronic continuously variable transmission (eCVT) 160 that also couples engine 115 and EM 120 of powertrain 110. Transmission 160 may also be a multiple step-ratio, and/or a multiple and variable torque-multiplier-ratio, automatic and/or manual transmission or gearbox 160 having a plurality of selectable, variable ratio gears. Transmission or eCVT 160 may include EM 120, disconnect clutch 125, and MD 155 to be integral with transmission or eCVT 160 in some variations.

Transmission or gearbox 160 may include gear sets (not shown) or a plurality of manually and/or electronic, automatically selectable gears that are selectively placed in different gear ratios by manually or automatically actuated hydraulic or electromechanical engagement of friction elements such as clutches and brakes, and other elements, to establish the desired multiple, discrete, or step drive and torque multiplier ratios. The friction elements are controllable through a shift schedule implemented by one or more controllers that connects and disconnects certain elements of the gear sets to control the torque multiplier ratio between drive shafts 130, 140, and output transmission drive shaft 150. eCVT or Transmission 160 is manually and/or automatically shifted by the controllers from one torque multiplier ratio to another based on various vehicle operating conditions, as described elsewhere herein. Transmission 160 then transmits powertrain output torque to output drive shaft 150 to propel HEV 100, and to drive shafts 130, 140 to spool up and start CE 115, and to enable reduction in CE start noise and vibration.

Transmission 160 is but one example of a transmission or gearbox arrangement, and any comparable component that converts and transmits input torque(s) from engine 115 and EM 120 to output drive shaft 150 at such different torque multiplier ratios, is contemplated for use with the embodiments described herein. For example, transmission 160 may be implemented by an automated mechanical (or manual) transmission that includes servo motors to translate and rotate shift forks along a shift rail to select a desired gear ratio, which can be configured for operation with a range of vehicle torque requirements.

In other variations, a transmission oil pump 165 is included and is coupled to EM 120 to produce hydraulic oil pressure for any number of components, which can include, for example, release or disconnect clutch 125, MD 155, and transmission 160, when engine 115 is decoupled and/or powered down. An electric auxiliary transmission oil pump 170 may also be included for use alone or in combination with other components, and to also supplement and/or generate hydraulic pressure when both engine 115 and EM 120 are unpowered, or otherwise unable to produce hydraulic pressure.

Powertrain 110 and/or driveline 105 further include one or more batteries 175, 180. One or more such batteries can be a higher voltage, direct current battery or batteries 175 operating in ranges between about 48 to 600 volts, and sometimes between about 140 and 300 volts or more or less, which is/are used to store and supply power for EM 120, and other vehicle components and accessories. Other batteries can be a low voltage, direct current battery(ies) 180 operating in the range of between about 6 and 24 volts or more or less, which is/are used to store and supply power for starter 135 to start engine 115, and for other vehicle components and accessories.

Batteries 175, 180 are respectively coupled to engine 115, EM 120, and vehicle 100, as depicted in FIG. 1, through various mechanical and electrical interfaces and vehicle controllers, as described elsewhere herein. High voltage EM battery 175 is also coupled to EM 120 by one or more of a motor control module (MCM), a battery control module (BCM), and/or power electronics 185, which are configured to condition direct current (DC) power provided by high voltage (HV) battery 175 for EM 120. MCM/BCM 185 is also configured to condition, invert, and transform DC battery power into three phase alternating current (AC) as is typically required to power electric machine or EM 120. MCM/BCM 185 is also configured to charge one or more batteries 175, 180 with energy generated by EM 120 and/or FEAD components, and to supply power to other vehicle components as needed.

Vehicle 100 may also incorporate one or more brakes 190 coupled to wheels 154 and brake system control module (BSCM) 195. Brakes 190 and BSCM 195 may be operative to mechanically and/or electrically decelerate wheels 154, and to enable regenerative braking that captures deceleration energy from wheels 154, and in cooperation with MCM/BCM 185, and possibly other controllers, EM 120, and other components, enables charging of HV battery(ies) 175 and other batteries 180, and other power storage components.

With continued reference to FIG. 1, vehicle 100 further includes one or more controllers and computing modules and systems that enable a variety of vehicle capabilities. For example, vehicle 100 may incorporate a vehicle system controller (VSC) 200 and a vehicle computing system (VCS) and controller 205, which are in communication with MCM/BCM 185, BSCM 195, and other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components.

While illustrated here for purposes of example, as discrete, individual controllers, MCM/BCM 185, BSCM 195, VSC 200 and VCS 205 may control, be controlled by, communicate signals to and from, and communicate with other controllers, and other sensors, actuators, signals, and components that are part of the larger vehicle and control systems and internal and external networks. The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers both in the singular and plural connotations, and individually, collectively, and in various suitable cooperative and distributed combinations.

Further, communications over the network and CAN 210 are intended to include responding to, sharing, transmitting, and receiving of commands, signals, data, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip (SoCs) may be used to precondition and preprocess particular signals during communications, and before and after such are communicated.

In further illustrations, MCM/BCM 185, BSCM 195, VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data.

With attention invited again to FIG. 1, vehicle 100 also may include VCS 205 to be the SYNC onboard vehicle computing system manufactured by the Ford Motor Company (See, for example, U.S. Pat. No. 9,080,668). Vehicle 100 also may include a powertrain control unit/module (PCU/PCM) 215 coupled to VSC 200 or another controller, and coupled to CAN 210 and engine 115, EM 120, and eCVT 160 to control each powertrain component. A transmission control unit (TCU) 220 is also coupled to VSC 200 and other controllers via CAN 210, and is coupled to eCVT/transmission 160 and also optionally to MD 155, to enable operational control. An engine control module (ECM) or unit (ECU) or energy management system (EMS) 225 may also be included to be in communication with CAN 210, and is coupled to engine 115 and VSC 200 in cooperation with PCU 215 and TCU 220 and other controllers.

In this arrangement, VSC 200 and VCS 205 cooperatively manage and control the vehicle components and other controllers, sensors, and actuators. For example, the controllers may communicate control commands, logic, and instructions and code, data, information, and signals to and/or from engine 115, disconnect clutch 125, EM 120, MD 155, eCVT or transmission 160, batteries 175, 180, and MCM 185, and other components and systems. The controllers also may control and communicate with other vehicle components known to those skilled in the art, even though not shown in the figures. The embodiments of vehicle 100 in FIG. 1 also depict exemplary sensors and actuators in communication with vehicle network and CAN 210 that can transmit and receive signals to and from VSC 200, VCS 205, and other controllers.

For example, vehicle 100 may include an accelerator position and motion sensor (APP) 230, a brake pedal position and motion sensor (BPP) 235, and other driver controls and vehicle profile and performance parameters (VPP) 240, which may include steering wheel position and motion sensors, driver turn signal position sensors, driver selectable vehicle performance preference profiles and parameters, and driver selectable vehicle operational mode sensors and related profile parameters and settings. Such profile parameters and settings may include profile parameters, which may be driver selectable and which may establish various preferred and/or predetermined vehicle performance characteristics and driver profile preferences, as described elsewhere herein. A restraint system control module (RCM) 245 may also be incorporated and may include various accelerometers, and vibration sensors in communication with the contemplated controllers. Further, vehicle 100 may have VCS 205 configured with one or more communications, navigation, and other sensors, as described elsewhere herein with respect to the Ford Motor Company SYNC system, and other similar systems. VCS 205 can cooperate with VSC 200 and other controllers to manage and control vehicle 100 in response to sensor and communication signals identified, established by, and received from these vehicle systems and components.

For further example, various other vehicle functions, actuators, and components may be controlled by the controllers within the vehicle systems and components, and may receive signals from other controllers, sensors, and actuators, which may include, for purposes of illustration but not limitation, various HEV 100 operating conditions (OCs) such as fuel injection timing and rate and duration, throttle valve position, spark plug ignition timing (for spark-ignition engines), intake/exhaust valve timing and duration, front-end accessory drive (FEAD) components such as an air conditioning compressor, a transmission oil pump, an alternator or generator, EM 120, high and low voltage batteries 175, 180, and various sensors for regenerative braking, battery charging or discharging (including sensors for determining the maximum charge, state of charge, and discharge power limits), temperature, voltage, current, state of charge (SOC), maximum charge, and discharge power limits, clutch pressures for disconnect clutch 125, MD 155, transmission 160, and other components.

Sensors communicating with the controllers and CAN 210 may, for further example, establish or indicate CE 115 OCs such as turbocharger boost pressure, crankshaft position or profile ignition pickup (PIP) signal, engine rotational speed or revolutions per minute (RPM), wheel speeds (WS1, WS2, etc.), vehicle speed sensing (VSS), engine coolant temperature (ECT), intake manifold air pressure (MAP), accelerator pedal position sensing (PPS) or APP 230, brake pedal positon sensing (BPS) or BPP 235, ignition switch position (IGN), throttle valve position (TP), air temperature (TMP), barometric pressure, exhaust gas oxygen (EGO) or other exhaust gas component concentration or presence, intake mass air flow (MAF), transmission gear, ratio, or mode, transmission oil temperature (TOT), transmission speed (TS), and deceleration or shift mode (MDE), among others.

As depicted in the various figures, including FIGS. 1 and 2, and others, such control logic and executable instructions and signals, and data can also include vehicle torque demand signals (TDS) 250, other signals (OS) 255, and control or command signals (CS) 260 received from and sent to vehicle controllers, components, and systems. Such signals and commands may be from any of the vehicle controllers, sensors, actuators, components, and systems signals. Any or all of these signals can be raw analog or digital signals or preconditioned, preprocessed, combination, and/or derivative signals generated in response to other signals, and embedding information therein. TDSs 250 and OSs 255 may include a variety of specific signals, including for purposes of illustration without limitation, battery charge state, transmission input speed, charge-torque, and various limit signals, as well as digital data and information embedded in such signals, and as described in more detail elsewhere herein.

The communication and operation of the described signals 250, 255, commands 260, control instructions and logic, and data and information by the various contemplated controllers, sensors, actuators, and other vehicle components, may be represented schematically as shown in FIG. 1, and by flow charts or similar diagrams as exemplified in FIG. 2, and elsewhere herein. Such flow charts and diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof. The steps and functions shown may be executed, communicated, and performed in the sequence depicted, and in parallel, in repetition, in modified sequences, and in some cases may be combined with other processes and omitted. The commands, control logic, and instructions may be executed in one or more of the described microprocessor-based controllers and may be embodied as primarily hardware, software, virtualized hardware, firmware, virtualized firmware, and combinations thereof.

During operation of vehicle 100 when CE 115 is stopped and is to be started, and with continued reference to FIG. 1 and now also to FIG. 2, vehicle 100 incorporates a controller 300, such as one or more of VSC 200, VCS 205, PCU 215, and others, which controller(s) is/are configured to initiate signals 250, 255, control logic, CS 260, and instructions at step 305 (FIG. 2), to detect or receive at step 310, current operating conditions (OC) of HEV 100, CE 115, and other components of HEV 100. Such contemplated OCs include any number of CE 115 OCs, environmental OCs such as ambient temperature, EM 120 speed and acceleration, RCM 245 accelerations and vibrations, CE 115 engine mount vibrations, HEV 100 sensitivity parameters that can include seat track accelerations and steering wheel characteristics among others, active noise canceling/control microphone noise signals, temperature of CE 115 and EM 120, ECU 225 start parameters such as target crank speed for current OCs, MCM/BCM 185 discharge limits, and other parameters and conditions.

An engine start OC and noise and vibration recorder 270 may be included with and/or coupled to the controller(s), the historical database 330 and other components and systems of HEV 100. Recorder 270 is configured to generate and store in the historical database 330, new HOCGs for each engine start and to also include the MNVM.

With such OCs, the controller(s) at step 315 are configured to detect and estimate current OC noise and vibration, and at step 320 to correlate such with predetermined and/or experimentally determined CE start noise and vibration that is perceived by occupants of HEV 100, and to generate respective correlation factors for each source of such noise and vibration. The correlation factors 320 are utilized by the controller(s) at step 325 to generate a minimum noise and vibration metric (MNVM), that is a dimensionless value characterizing perceived noise and vibration for the current OCs and each start sequence. At step 330, each generated MNVM is stored in an historical database 330 of OC profiles that also capture and store the detected OCs, which are stored together as OC grids (OCGs), which may be similar to those depicted schematically in FIG. 3, and as further described elsewhere herein. The historical profile database 330 captures and stores historical CE start OCGs (HOCGs) of prior engine and/or CE 115 starts, which are recorded as SOCGs in the historical profile database, which includes the respective MNVMs.

With continued reference to FIGS. 2 and 3, the controller(s), such as controller 300, also at step 335 incorporate a cranking torque profile database 340 (FIG. 3), that also may be similar to that reflected in FIG. 3, which contains predetermined, baseline OC cranking torque profiles, which are stored as OC grids (SOCGs) 335, and which reflect optimal CE 115 start-up parameters and configurations for a plurality of OCs. Also at step 335, the one or more HEV controllers and/or components, search for the cranking torque baseline SOCG that is closest or nearest to the current OCs (NOCG), which is selected at step 345. Described differently, the controller(s) are configured to select a nearest operating condition (OC) grid (NOCG) from the stored operating condition grids (SOCGs) in the cranking torque profile database 340, according to the current, detected CE OC. The controller(s) utilize the current OC of the CE to search the cranking torque SOCGs to determine and then select the SOCG that is nearest to the current CE OC or NOCG.

Concurrently at step 350, the controller(s) also search for and select the historical profile database 330 for an historical start SOCG that is closest to the current OC (HOCG). If the historical database 330 is empty and no HOCGs exist, then a next nearest cranking torque baseline OCG (NNOCG) is searched and selected from the baseline database 340. Explained in another way, the controller(s) at step 350 also search the historical database 330 and select from the SOCGs one of: (a) an HOCG, and when there are not any stored HOCGs, (b) a nearest neighbor OC grid (NNOCG) from the cranking torque profile database 340.

The controller(s) are further configured to generate a blend factor at step 355, which is configured to enable the controller(s) to blend the selected NOCG, HOCG, and NNOCG according to how close each is to the current OCs. For example, the blend factor is generated from a comparison, difference, and/or "distance" between the current OC, the selected cranking torque NOCG, the selected historical start HOCG, and if applicable, the NNOCG. The blend factor is normalized to be between zero and one, and is generated as a smallest difference or "distance" between the current CE OC, and each of the NOCG and one of either the HOCG or the NNOCG. With the generated blend factor, a start profile is generated, produced, and calibrated by blending the selected NOCG and one of the HOCG and NNOCG. The start profile equals the sum of the blend factor times the NOCG, and one minus the blend factor times one of either the HOCG or the NNOCG. In this way, the blend factor may be utilized by the controllers to calibrate the start profile to more closely reflect which ever of the NOCG, HOCG, or NNOCG is closest to the OC.

The controller(s) at step 360 then generate a feedforward torque signal (FFTS) 360 that can be utilized to control and adjust torque output of EM 120 at step 365, to reduce noise and vibration resonances during start of engine or CE 115. Further, at step 370, the controller(s) utilize the selected NOCG of step 345 to generate a cranking torque signal (CTS) 370, which is utilized at step 375 to generate a compensation factor 375 from a damper model of MD 155. The CTS 375 is further calibrated at step 380 with the compensation factor 375 according to the modeled performance of MD 155 under the currently detected OC. The calibrated CTS 375 is utilized at step 385 to adjust a gear ratio of eCVT 160, to further reduce and compensate the possible resonant noise and vibration during startup of CE or engine 115. With the adjusted eCVT 160 gear ratio, the controller(s) further adjust EM torque at step 365, and control proceeds to an end at step 390, whereupon the controller(s) return control to step 305 to repeat at the discrete time intervals.

The descriptions herein refer to systems, methods, components, elements, nodes, or features being in "communication" and or "coupled" together. As used herein, unless expressly stated otherwise, use of these terms and words are intended and must be understood to mean that one system/method/sensor/actuator/component/element/module/feature is directly or indirectly coupled, joined to, and/or communicates with another, either electronically, mechanically, or both and in some similar way that enables cooperative operation and exchange and interchange of data and information.

Further, even though the various described implementations, figures, illustrations, and drawings depict representative examples and arrangements of components, elements, devices, and features, many different additional variations, arrangements, modifications, and intervening components, elements, devices, and features, may also be present in further exemplary implementations that are contemplated by the present disclosure.

Terms, words, and phrases used in this document, and variations thereof, unless otherwise expressly stated, must be construed as open ended as opposed to limiting. For example, the term "including" should be understood to mean "including, without limitation" or similar meanings; the term "example" is used to loosely describe illustrative instances of the item being described, but is not an exhaustive, exclusive, or limiting list; and adjectives such as "conventional," "traditional," "normal," "standard," "known", and terms with similar meanings must not be construed to limit the description to a given example, or to an exemplary item commercially available in the market as of a specific date and time period.

Instead, these descriptions are intended to be understood to include conventional, traditional, normal, or standard technologies that may be available now and at any time in the future in some improved and modified form according to the innovations described in this disclosure. Similarly, a group of words described and joined with the conjunction "and" or the disjunctive "or" must be understood only as exemplary and representative but not exclusive groups, and not as requiring that only or each and every one of those described items must be or must not be present in the contemplated group. Rather, use of such conjunctives and disjunctives must be understood to mean "and/or" unless expressly stated otherwise.

Similarly, a group of words linked with the conjunction "or" must not be understood as requiring mutual exclusivity among that group, but rather must also be understood as meaning "and or" unless expressly stated otherwise. Also, although words, items, elements, or components of this disclosure are described or claimed in the singular, the plural is also intended and contemplated to be within the scope of such a description unless limitation to the singular is explicitly stated as a requirement. The presence or absence of broadening words and phrases such as "one or more," "at least," "but not limited to" or other like phrases in some instances are intended to be interpreted to contemplate broader meanings, but must not be understood to mean that narrower meanings are implied, intended, or required.

What is claimed is:
1. A vehicle comprising:
an electronic continuously variable transmission coupled to an engine, electric machine, and at least one controller configured to, at discrete time intervals during engine start:
adjust torque of the electric machine to reduce startup vibration of the engine with a feedforward torque signal generated from an engine start profile produced with a blend factor generated as a difference between an engine operating condition and stored operating condition grids.

2. A vehicle comprising:
an engine;
an electric machine;
a continuously variable transmission coupled to the engine and the electric machine; and
a controller coupled to the engine, the electric machine, and the continuously variable transmission, the controller configured to adjust torque of the electric machine to reduce startup vibration of the engine using a feedforward torque signal generated from an engine start profile produced with a blend factor corresponding to a difference between an engine operation condition and stored operating condition grids, wherein the controller is further configured to:
select a nearest operating condition grid from the stored operating condition grids according to a current engine operating condition,
select from the stored operating condition grids one of: (a) an historical operating condition, and (b) a nearest neighbor operating condition grid when no historic operating condition grid exists, and
generate the blend factor as the difference being a smallest of a distance between the current engine operating condition, and each of the nearest operating condition and the one of the historical operating condition grid and the nearest neighbor operating condition grid,
calibrate the start profile with the blend factor and the NOCG and the one of the HOCG and NNOCG, and
generate an engine cranking torque and the feedforward torque signal from the calibrated start profile.

3. The vehicle according to claim 2, further comprising:
the at least one controller further configured to:
select the NOCG and NNOCG from the SOCGs in a database of predetermined baseline OC grids, and the HOCG from an historical database of SOCGs of prior engine starts.

4. The vehicle according to claim 2, further comprising:
the at least one controller further configured to:
generate a cranking torque compensation factor according to a mechanical damper model of the transmission,
calibrate the engine cranking torque with the compensation factor, and adjust a gear ratio of the transmission according to the calibrated start profile and the calibrated engine cranking torque.

5. The vehicle according to claim 2, further comprising:
an engine start OC and noise and vibration recorder; and
the at least one controller coupled with the recorder and further configured to:
generate and store with the recorder in a database of HOCGs, new HOCGs for each engine start that includes a minimum noise and vibration metric (MNVM).

6. A method for controlling a vehicle, comprising:
by a controller coupled to an electronic continuously variable transmission, an engine, and an electric machine:
adjusting at discrete time intervals during starting of the engine, a torque of the electric machine using a feedforward torque signal generated from an engine start profile produced with a blend factor generated as a difference between an engine operating condition and stored operating condition grids, including:
selecting a nearest operating condition grid from the stored operating condition grids according to a current engine operating condition,
selecting from the stored operating condition grids one of: (a) an historical operating condition grid, and (b) a nearest neighbor operating condition grid when no historical operating condition grid exists,
generating the blend factor as the difference being a smallest of a distance between the current engine operating condition and each of the nearest operating condition grid and the selected one of the historical operating condition grid and the nearest neighbor operating condition grid,
calibrating the start profile with the blend factor and the nearest operating condition grid and the selected one of the historical operating condition grid and the nearest neighbor operating condition grid, and
generating an engine cranking torque and the feedforward torque signal from the calibrated start profile.

7. The method for controlling a vehicle according to claim 6, further comprising:
by the at least one controller:
selecting the NOCG and NNOCG from the SOCGs in a database of predetermined baseline OC grids, and the HOCG from an historical database of SOCGs of prior engine starts.

8. The method for controlling a vehicle according to claim 6, further comprising:
by the at least one controller:
generating a cranking torque compensation factor according to a mechanical damper model of the transmission,
calibrating the engine cranking torque with the compensation factor, and
adjusting a gear ratio of the transmission according to the calibrated start profile and the calibrated engine cranking torque.

9. The method for controlling a vehicle according to claim 6, further comprising:
by the at least one controller, further coupled with an engine start OC and noise and vibration recorder:
generating and storing with the recorder in a database of HOCGs, new HOCGs for each engine start that includes a minimum noise and vibration metric (MNVM).

* * * * *